(12) United States Patent
Kim

(10) Patent No.: US 10,677,203 B2
(45) Date of Patent: Jun. 9, 2020

(54) EGR FILTER FOR PREVENTING CLOGGING

(71) Applicants: Hyundai Motor Company, Seoul (KR); Kia Motors Corporation, Seoul (KR)

(72) Inventor: Jong-Cheon Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/213,399

(22) Filed: Dec. 7, 2018

(65) Prior Publication Data

US 2019/0383244 A1    Dec. 19, 2019

(30) Foreign Application Priority Data

Jun. 15, 2018  (KR) .......................... 10-2018-0068824

(51) Int. Cl.
| | |
|---|---|
| *F02M 26/35* | (2016.01) |
| *F02M 26/06* | (2016.01) |
| *B01D 39/10* | (2006.01) |
| *F02M 26/22* | (2016.01) |
| *F02M 26/05* | (2016.01) |

(52) U.S. Cl.
CPC ............ *F02M 26/35* (2016.02); *B01D 39/10* (2013.01); *F02M 26/05* (2016.02); *F02M 26/06* (2016.02); *F02M 26/22* (2016.02)

(58) Field of Classification Search
CPC .. B01D 39/12; B01D 46/0005; B01D 46/103; B01D 46/10; F02M 26/15; F02M 26/35; F02M 26/11; Y02T 10/20
See application file for complete search history.

(56) References Cited

U.S. PATENT DOCUMENTS

| | | | | |
|---|---|---|---|---|
| 5,180,409 A | * | 1/1993 | Fischer | B01D 39/086 |
| | | | | 139/408 |
| 5,266,279 A | * | 11/1993 | Haerle | B01D 39/12 |
| | | | | 422/177 |
| 2011/0173956 A1 | * | 7/2011 | Kotthoff | B01D 39/12 |
| | | | | 60/278 |
| 2012/0186205 A1 | * | 7/2012 | Wieres | F01N 3/021 |
| | | | | 55/385.3 |
| 2014/0047807 A1 | * | 2/2014 | Elsasser | B01D 39/20 |
| | | | | 55/486 |

FOREIGN PATENT DOCUMENTS

KR    10-2017-0119843 A    10/2017

* cited by examiner

*Primary Examiner* — Sizo B Vilakazi
(74) *Attorney, Agent, or Firm* — Morgan, Lewis & Bockius LLP

(57) ABSTRACT

An EGR filter is configured for preventing clogging, which is disposed in an EGR line which recirculates a portion of the exhaust gas exhausted from an engine to the engine, and mounted in an EGR filter assembly which filters foreign material contained in the exhaust gas, wherein the EGR filter is woven to the twill weave with a weft and a warp of metal material.

8 Claims, 7 Drawing Sheets

EGR FILTER FOR PREVENTING CLOGGING

CROSS-REFERENCE TO RELATED APPLICATIONS

The present application claims priority to Korean Patent Application No. 10-2018-0068824, filed on Jun. 15, 2018, the entire contents of which is incorporated herein for all purposes by this reference.

BACKGROUND OF THE DISCLOSURE

Field of the Disclosure

The present invention relates to an EGR filter mounted on an exhaust gas recirculation (EGR) cooler of an Exhaust gas recirculation (EGR) system of a vehicle, and more particularly, the present invention relates to an EGR filter for preventing clogging that can improve the fluidity of an EGR gas by expanding the effective space and being asymmetrically thermally expanded to prevent the phenomenon clogged by the carbon, the soot and the foreign substance.

Description of Related Art

In a vehicle, some of the exhaust gas which is combusted in an engine is recycled to reduce the amount of harmful material contained in the exhaust gas.

When the exhaust gas is recirculated, a combusting temperature inside the engine is reduced to reduce the nitrogen oxide (NOx) contained in the exhaust gas, which is one of the measures to cope with the exhaust gas regulation.

The EGR system may be divided into LP-EGR (low pressure-EGR) and HP-EGR (high pressure-EGR) depending on the mounting position.

In a supercharged vehicle, such as a turbocharger, the LP-EGR 60 is disposed at the rear end portion of the post-treatment unit 40 in addition to the HP-EGR 50 mounted at the rear end portion of the exhaust manifold due to the high-pressure exhaust gas characteristic, so that normal operating environment is formed by securing hydraulic pressure.

An exhaust system of an engine to which the HP-EGR 50 and the LP-EGR 60 are applied, is shown in FIG. 1.

The outside air flowed from the outside flows into each cylinder of the engine 10 through a compressor 32 of a turbocharger 30, an intercooler 13 and an intake manifold 12 disposed in an intake line 11. Exhaust gas generated after combusted in the engine 10 passes through an exhaust manifold 22, a turbine 31 of the turbocharger 30 disposed in the exhaust line 21, passes through a post-treatment device 40 such as a Diesel Particulate Filter (DPF) or a Diesel Oxidation Catalyst (DOC) and then released to the outside.

At the instant time, a high pressure EGR line 51 is disposed so that the exhaust manifold 22 and the intake manifold 12 are connected, and a high pressure EGR valve 52 and a high pressure EGR cooler 53 are disposed in the high pressure EGR line 51. The high pressure EGR valve 52 controls the amount of the exhaust gas recirculated through the high pressure EGR line 51 and the high pressure EGR cooler 53 cools the recirculated exhaust gas.

Also, a low pressure EGR line 61 is disposed so that the rear end portion of the post-treatment device 40 and the front end portion of the compressor 32 are connected to each other, and a low pressure EGR valve 62 and a low pressure EGR cooler 63 are disposed in the low pressure EGR line 61.

Likewise, the low pressure EGR valve 62 controls the amount of the exhaust gas recirculated through the low pressure EGR line 61 and the low pressure EGR cooler 63 cools the recirculated exhaust gas.

Meanwhile, since the exhaust gas is flowed into the front end portion of the compressor at the low pressure EGR line 61, an EGR filter assembly 170 is disposed to protect the components of compressor 32, for example, a blade and a compressor wheel, and the like.

The EGR filter assembly 170 includes, as shown in FIG. 2, an EGR filter 171 woven with a wire and mounted inside the housing 172. In the EGR filter assembly 170 according to the conventional art, the EGR filter 171 is manufactured by weaving the wire into weft yarns and warp yarns. The weft yarn 171a and the warp yarn 171b are manufactured by plain weave, that is, by weaving alternating the weft yarn 171a and the warp yarn 171b to cross each other. There is a problem that clogging of the mesh of the EGR filter 171 occurs due to soot, carbon, or other foreign material because the EGR filter 171 is woven by plane weave as a wire of the same material as weft yarn 171a and warp yarn 171b. Because the weft yarn 171a and the warp yarn 171b are plain weave, the texture is hard. Furthermore, since the weft yarn 171a and the warp yarn 171b are the same material wire, thermal expansion coefficients are equal to each other, so that the weft yarn 171a and the warp yarn 171b are thermally expanded at the same ratio even during thermal expansion. Accordingly, the soot, carbon or other foreign material clogged between the meshes of the EGR filter are deposited in the EGR filter 171, which is not easily removed from the EGR filter 171, resulting in clogging.

When the EGR filter 171 is clogged, there is a problem that the differential pressure increases in the LP-EGR line 61 and the cooling performance of the LP-EGR cooler 63 deteriorates.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an EGR filter for preventing clogging in which an EGR filter is disposed to expand the internal effective space thereof and asymmetrically thermally expand for self-cleaning of the deposit, preventing the EGR filter from being clogged by carbon, soot and foreign material.

An EGR filter for preventing clogging according to an exemplary embodiment of the present invention to solve the above objects, which is disposed in an EGR line which recirculates a portion of the exhaust gas exhausted from an engine to the engine, and mounted in an EGR filter assembly which filters foreign material contained in the exhaust gas; and the EGR filter is woven to the twill weave with a weft and a warp of metal material.

The weft may pass a predetermined number of warps and then cross an adjacent warp.

The wefts adjacent to each other may cross the warps different from each other.

The weft and the warp may have different heat expansion ratios.

The warp may be formed of a material with a thermal expansion ratio than greater than a thermal expansion ratio of the weft.

The weft may be made of SUS 300 series material; and the warp may be made of SUS 400 series material.

The EGR filter assembly may be disposed at a low pressure EGR line of EGR system.

In accordance with an EGR filter for preventing clogging having the above configurations, by weaving the EGR filter with twilling weft and warp, it is possible to prevent the accumulation of carbon, soot and foreign material by increasing the effective space ratio.

Furthermore, since the weft and the warp making up the EGR filter have different heat expansion ratios, the deposited carbon, soot, and foreign material may be easily removed and self-cleaning becomes possible.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
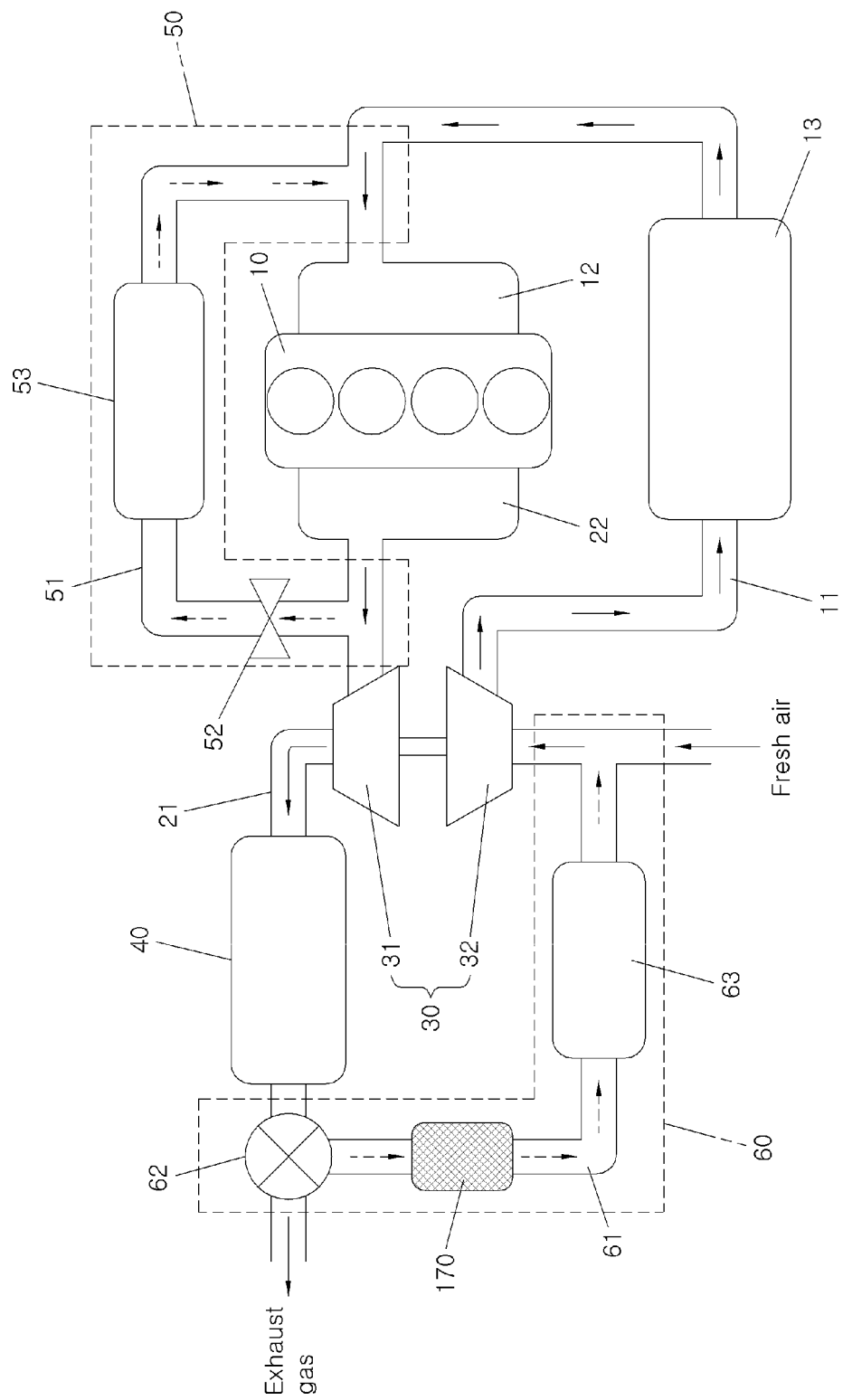
FIG. 1 is a schematic diagram of an engine.
Figure 2:
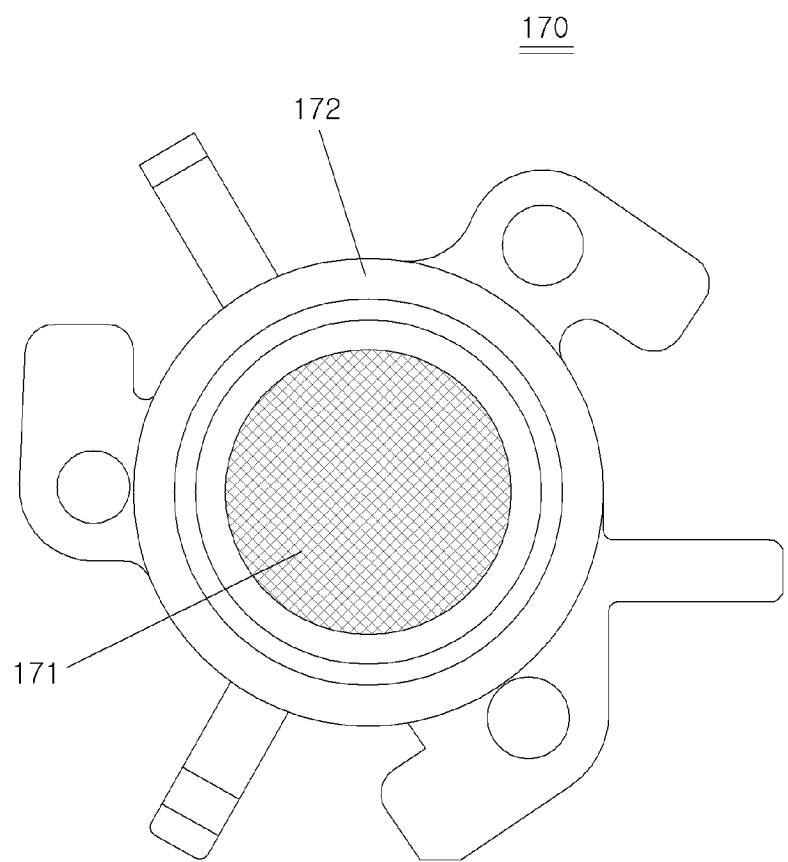
FIG. 2 is a cross-sectional view of an EGR filter according to the conventional art.
Figure 3:
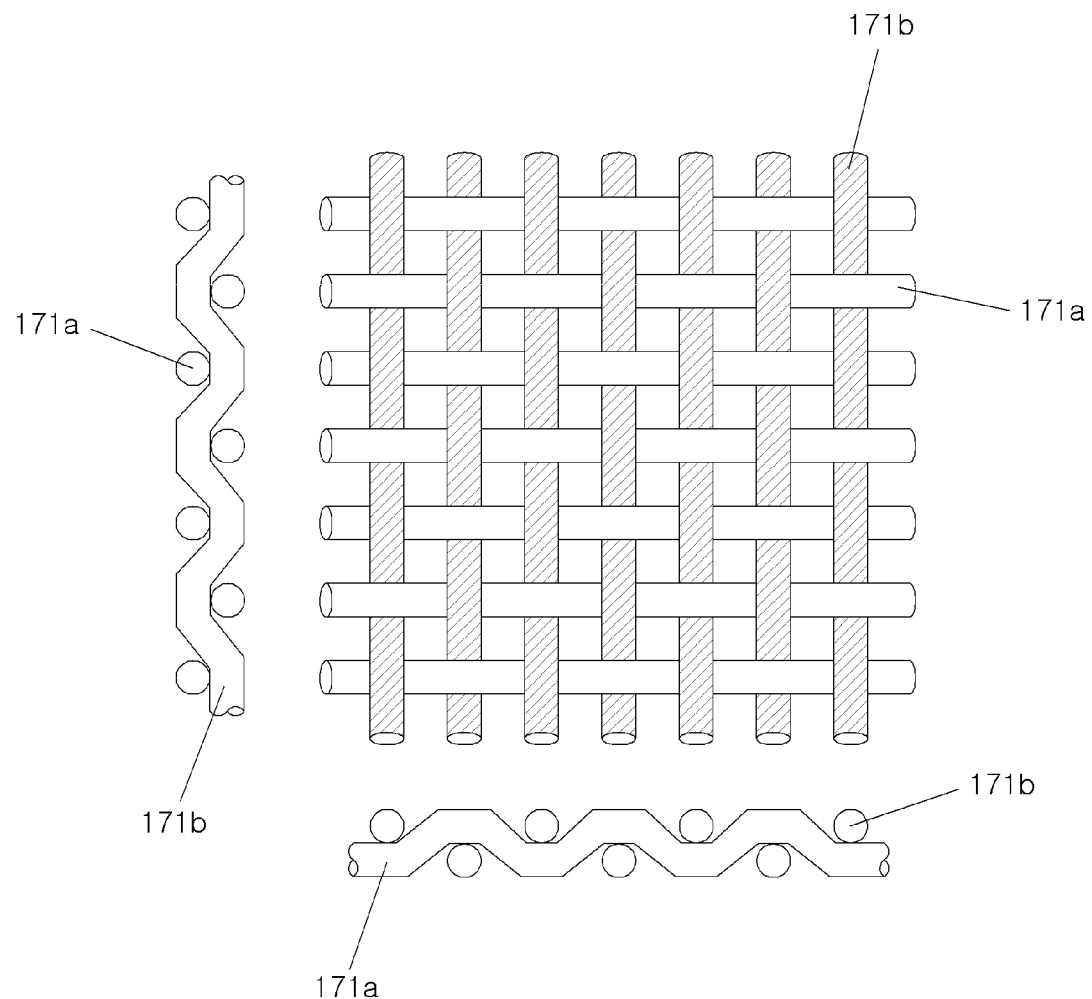
FIG. 3 is a schematic diagram showing the weaving state of the EGR filter according to the conventional art.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

To better understand the present invention, exemplary embodiments of the present invention will be explained with reference to the attached drawing. Exemplary embodiments of the present invention may be modified in various forms and the range of the present invention may not be construed as limited to the exemplary embodiments detailed below. The present exemplary embodiments are provided to more fully describe the present invention to those skilled in the art. Thus, the shape, and the like of an element in a drawing may be exaggerated to emphasize a clearer description. It may be noted that the same components in each drawing are denoted by the same reference numerals. Detailed descriptions of known features and configurations which may unnecessarily obscure the gist of the present invention are omitted.

The EGR filter assembly provided with an EGR filter 71 according to an exemplary embodiment of the present invention is disposed in an EGR line, particularly a low pressure EGR line 61, which circulates a portion of the exhaust gas expelled from the engine 10 back to the engine 10, and filters the foreign material.

In the EGR filter assembly, the EGR filter 71 with weaving weft and warp is mounted inside a housing.

In an exemplary embodiment of the present invention, the EGR filter 71 is woven using a wire, and the weft 71a and the warp 71b are weaved in twill weave.

In weaving the EGR filter 71 using metal wire, instead of plain weave where weft and warp intersect each other all the time, the weft 71a and the warp 71b are woven into twill weave to cross over two or more strands, so that carbon, suit, and foreign material are easily separated and do not block the EGR filter 71. The twill weave is formed by intersecting the weft and the warp by crossing over two or more strands when weaving the weft and the warp, so that the intersection point where the weft and the warp intersect is formed in oblique direction thereof. On the other hand, since the weft and the warp intersect in plain weave all the time, the intersection where the weft and the warp intersect is also formed in a lattice form.

In the twill weave, the weft is crossed with the warp after skipping two or more strands, so that the fabrics woven in the twill weave is more elastic than fabrics made in the plain weave.

In weaving the weft 71a and the warp 71b, the weft 71a passes two or more predetermined numbers of the warp 71b to be crossed at the just next the warp 71b, and the present pattern is repeated and the weft 71a and the warp 71b are woven to the twill weave.

Figure 4:
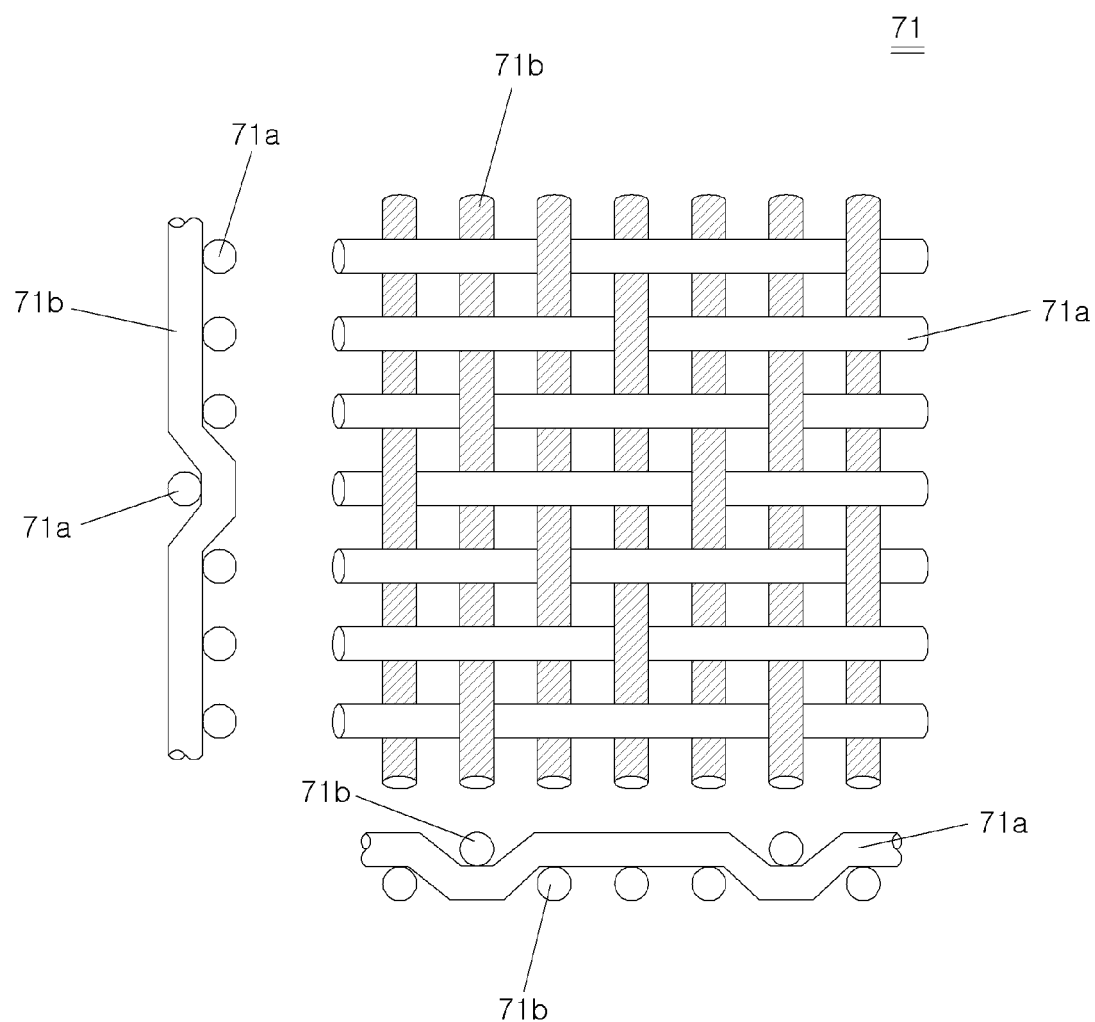
FIG. 4 is a schematic diagram showing the weaving state of an EGR filter according to an exemplary embodiment of the present invention.

For example, in FIG. 4, the weft 71a passes through three the warps 71b, then crosses the just next warp 71b, passes through three the warps 71b again, and then woven in the warp 71b, in a repeating fashion.

The weft 71a is crossed at the warp 71b, which is different from the other adjacent weft 71a. That is, in FIG. 4, the first weft 71a may intersect the third warp 71b, the second weft 71a may intersect the fourth warp 71b, the third weft 71a may intersect the second warp 71b, and the fourth weft 71a may intersect the first warp 71b.

Since the weft 71a and the warp 71b are woven to the twill weave, it is possible to prevent clogging of the filter by increasing the effective space and easily exhausting carbon, soot, and foreign material, compared with the case of weaving with the plain weave.

Figure 5A:
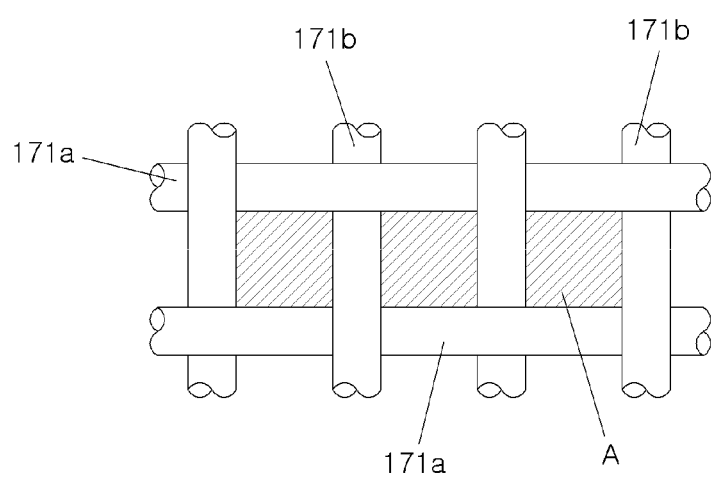
FIGS. 5A and 5B are schematic diagrams showing the state where the effective space ratio is increased in the EGR filter according to an exemplary embodiment of the present invention.
Figure 5B:
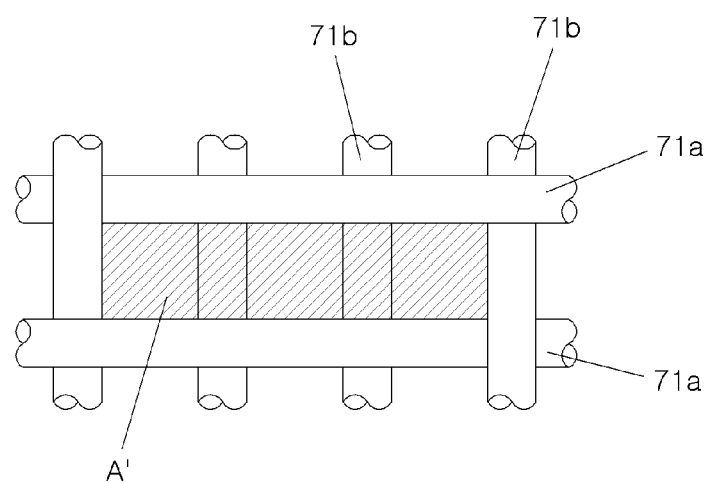
Figure 6:
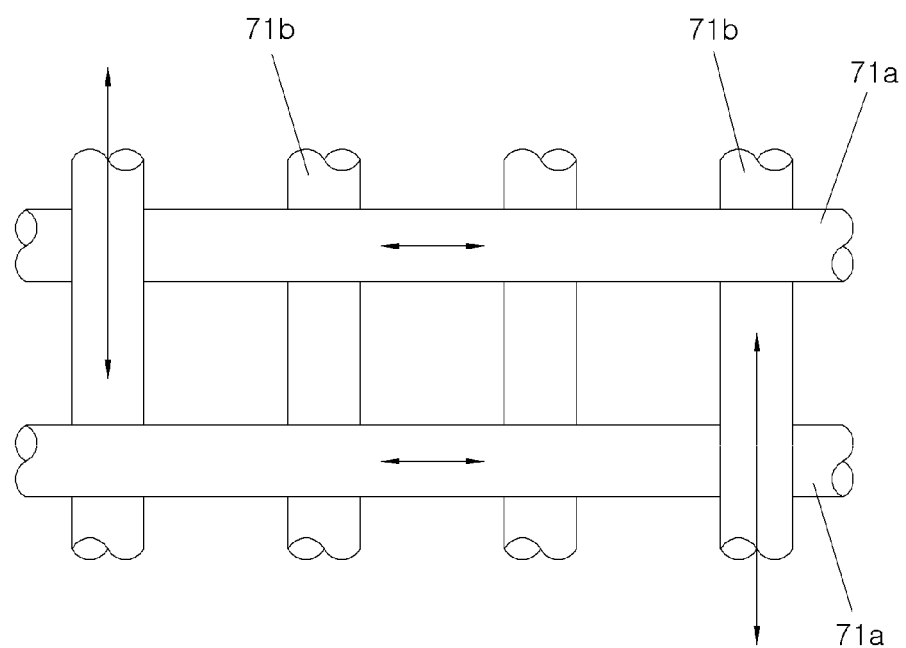
FIG. 6 shows the schematic diagram of the heat expansion state in the EGR filter according to an exemplary embodiment of the present invention.

That is, as shown in FIGS. 5A and 5B, when the weft 171a and the warp 171b are woven to the plain weave, the area A formed by the gap between wefts adjacent to each other and the gap between warps adjacent to each other becomes the effective space. Therefore, in FIG. 5, when two the wefts 171a and four the warps 171b are woven, three spaces with the area A are formed. Herein, the effective space becomes a space between lines and lines of open space in the filter area.

However, when the weft 71a and the warp 71b are woven to the twill weave, an area A' formed by a rectangle connecting point where the weft 71a and the warp 71b intersect becomes an effective space not the area formed by the wefts adjacent to each other, or the warps adjacent to each other. According to this, when two the wefts 71a and four the warps 71b are woven, in FIG. 5B, the area of the rectangle having the width of three times the space between the warps 71b and the height of the gap between the wefts 71a adjacent to each other becomes the effective space.

The area A' of the effective space in the twill weave is greater than the area A of the effective space in the plain weave, and also, because the area A' of the effective space of the twill weave is greater than three times area A of the effective space in the plain weave so that in the EGR filter 71, it is possible to prevent clogging of the filter due to carbon, soot, and foreign matter.

Also, in an exemplary embodiment of the present invention, the weft 71a and the warp 71b may include wires of different materials. The weft 71a and the warp 71b may include wires having different heat expansion rates so that the weft 71a and the warp 71b are asymmetrically thermally expanded during hot.

The weft 71a may be made of wire of SUS 400 series material, and the warp 71b may be made of wire of SUS 300 series material. SUS 300 series metal and SUS 400 series metal have different heat expansion rates. SUS 300 series metal has about 3 times larger heat expansion coefficient than SUS 400 series metal. Therefore, when the exhaust gas is supplied to the EGR filter 71 and the temperature of the EGR filter 71 increases, the weft 71a and the warp 71b thermally expand. After the engine is stopped and the EGR filter 71 is cooled, the weft 71a and the warp 71b are thermally shrunk. At the instant time, because the heat expansion rate of the warp 71b is greater than the heat expansion rate of the weft 71a, the deformation amount of the warp 71b is more deformed, so that carbon, soot and foreign material may be easily separated inside the EGR filter 71.

On the other hand, the material of the weft 71a may be a material with a larger thermal expansion rate than the warp 71b.

As described above, in weaving the EGR filter 71 according to an exemplary embodiment of the present invention using the weft 71a and the warp, the EGR filter 71 was woven to enlarge the effective space by the twill weave, and the warp 71b is made of material with a higher thermal expansion coefficient than the weft 71a to asymmetrically thermally expand during heating, self-cleaning of carbon, shoot and foreign material becomes possible.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An exhaust gas recirculation (EGR) filter for preventing clogging, which is mounted in an EGR line which recirculates a portion of exhaust gas exhausted from an engine to the engine, and mounted in an EGR filter assembly which filters foreign material contained in the exhaust gas,
    wherein the EGR filter is woven to a twill weave with a weft and a warp,
    wherein the weft and the warp have different heat expansion ratios, and
    wherein a mesh made by the weft and the warp is shaped to be square.

2. The EGR filter for preventing the clogging of claim 1, wherein the warp is in plural to form a plurality of warps and the weft is in plural form a plurality of wefts, and
    wherein each of the wefts passes a predetermined number of the warps and then crosses an adjacent warp among the plurality of warps.

3. The EGR filter for preventing the clogging of claim 2, wherein the predetermined number of the warps is three or more.

4. The EGR filter for preventing the clogging of claim 2, wherein the wefts adjacent to each other cross warps which are different from each other among the plurality of warps.

5. The EGR filter for preventing the clogging of claim 1, wherein the weft and the warp are made of metal material.

6. The EGR filter for preventing the clogging of claim 1, wherein the warp is formed of a material having a thermal expansion ratio than greater than a thermal expansion ratio of the weft.

7. The EGR filter for preventing the clogging of claim 6, wherein the well is made of SUS 300 series material; and
    wherein the warp is made of SUS 400 series material.

8. The EGR filter for preventing the clogging of claim 1, wherein the EGR filter assembly is mounted at a low pressure EGR line of an EGR system.

* * * * *